United States Patent [19]
Oeckl

[11] 3,951,394
[45] Apr. 20, 1976

[54] APPARATUS FOR PRODUCING TUBULAR BODIES FROM TWO SHELLS

[75] Inventor: Otto Oeckl, Munich, Germany

[73] Assignee: Maschinenfabrik Augsburg-Nurnberg AG, Munich, Germany

[22] Filed: May 1, 1974

[21] Appl. No.: 465,826

Related U.S. Application Data

[62] Division of Ser. No. 359,688, May 14, 1973, Pat. No. 3,829,959.

[30] Foreign Application Priority Data

May 20, 1972 Germany............................ 2224722

[52] U.S. Cl................................. 269/43; 51/217 R; 269/296; 269/321 W
[51] Int. Cl.²............................................ B23Q 3/00
[58] Field of Search.......... 51/217 R, 227 R; 228/4, 228/44, 47; 269/43, 44, 45, 91, 97, 98, 152, 164, 296, 321 W

[56] References Cited
UNITED STATES PATENTS

| | | | |
|---|---|---|---|
| 2,015,807 | 10/1935 | Miller | 269/152 |
| 2,186,641 | 1/1940 | Jones | 209/43 |
| 2,674,783 | 4/1954 | Schneider | 29/493 |
| 2,699,601 | 1/1955 | Darnell | 269/98 |

FOREIGN PATENTS OR APPLICATIONS

| | | | |
|---|---|---|---|
| 1,094,971 | 12/1960 | Germany | 269/91 |
| 1,955,989 | 5/1971 | Germany | 228/44 |

*Primary Examiner*—Roy Lake
*Assistant Examiner*—Mark S. Bicks
*Attorney, Agent, or Firm*—W. G. Fasse; W. W. Roberts

[57] ABSTRACT

The present method secures two shell members to respective holding means so that welding edges of the shells are exposed for a milling operation, preferably a simultaneous milling operation. The holding means are then placed back to back and secured against displacement relative to each other so that the milled welding edges contact each other precisely whereupon the edges are welded to each other by means of electron beams. The present apparatus is constructed for accomplishing said back to back locating of two holding means while simultaneously preventing the displacement of the shell members as well as the displacement of the holding means relative to each other. For this purpose, the present apparatus is provided with a base preferably formed as a carriage and with holding means for holding the shell member along its length to the base as well as with claws for clamping the ends of the shell member to the base.

10 Claims, 6 Drawing Figures

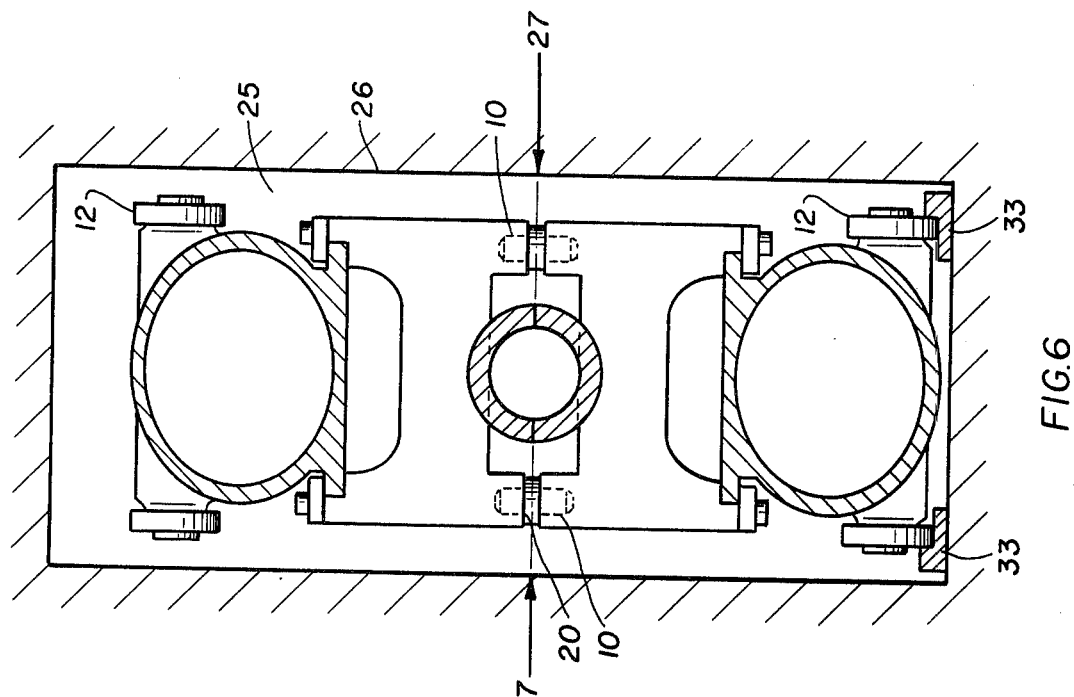
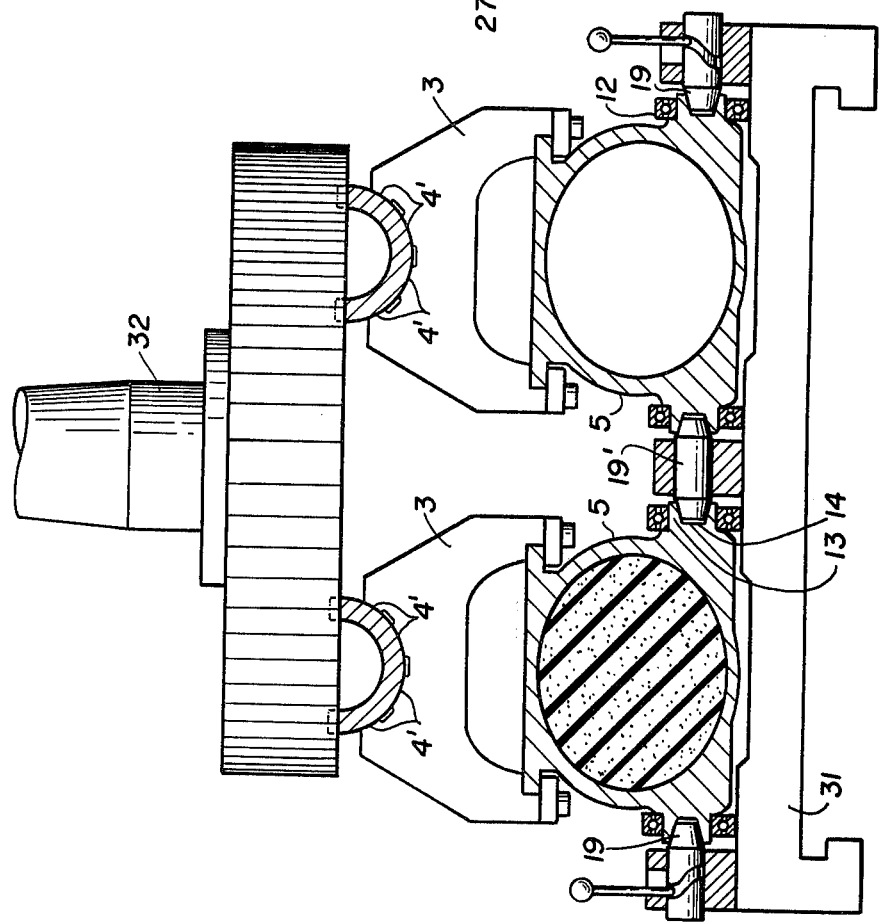

APPARATUS FOR PRODUCING TUBULAR BODIES FROM TWO SHELLS

This application is a divisional application of my copending application Ser. No. 359,688 filed on May 14, 1973, now U.S. Pat. No. 3,829,959 granted Aug. 20, 1974.

BACKGROUND OF THE INVENTION

The present invention relates to a method and apparatus for producing tubular bodies from two shell members, especially for producing axle bodies. It is known to produce axle bodies by conventionally welding two half shells to each other along longitudinal welding seams. The welding is generally accomplished by submerged arc welding or by welding under a protective inert gas, so called shielded arc welding.

Heretofore, it has not been possible to employ the most modern welding technique, namely the electron beam welding, for connecting two half shells to each other because heretofore it has not been possible to meet the conditions necessary for electron beam welding by presently known technical means. For employing the electron beam welding it is necessary that the milled welding seam or rather the welding surfaces meet very narrow surface tolerances. Moreover, it is necessary to assure a precise axial alignment of the surfaces which form the welding seam whereby deviations must be kept within the range of 0.1 to 0.2 mm for an overall length of the tubular body exceeding 2 meters.

OBJECTS OF THE INVENTION

In view of the foregoing, it it the aim of the invention to achieve the following objects singly or in combination:

to provide a method and apparatus which will permit to hold shell members relative to each other with such precision, even if they exceed an overall length of 2 meters, that electron beam welding may be employed;

to provide a method and apparatus for welding half shells made from sheet metal to each other to form axle bodies;

to provide a method and apparatus for welding half shells to each other whereby the milling of the welding surfaces and the welding itself may be accomplished without removing the half shells from their respective clamping apparatus;

to clamp the half shells in such a manner that aligning steps may be avioded while nevertheless assuring a high precision alignment of the surfaces to be welded so that electron beam welding may be employed; and to provide a welding method and apparatus which are suitable for the welding of shell members which have been prepared from sheet metal of substantial wall thickness, for example, in a hot die pressing step, whereby the shell members may have bends along their length extending in several directions when these shell members are removed from the die.

SUMMARY OF THE INVENTION

According to the invention there is provided a method for producing tubular or hollow bodies, for example, axle bodies by clamping the shell members in a holding fixture so that the shell member is axially aligned to avoid any warping, whereupon the welding edges of the shell members are milled, preferably simultaneously and thereafter one shell member is placed on top of the other shell member without removal of any of the shell members from their respective holding fixtures for the now following welding step by means of electron beams.

According to the invention there is further provided a holding fixture for securing a shell member without removal from the fixture throughout the several operational steps. The holding fixture comprises a base which is preferably a hollow base body stiff against bending and torsion. Holding means are secured, preferably adjustably, to said base preferably along prismatic type guides extending along the length of the base. The holding means include paws for clamping the ends of a shell member into a fixed position. The entire holding fixture is constructed in such a manner that the welding edges of the shell members are exposed for a milling operation, whereby the base is preferably provided with means for locking the holding fixture to the work table of a milling apparatus and for thereafter placing two of these holding fixtures into a back to back relationship to contact the welding surfaces of two shell members for the welding step.

BRIEF FIGURE DESCRIPTION

In order that the invention may be clearly understood, it will now be described, by wall of example, with reference to the accompanying drawings, wherein:

FIG. 5 illustrates the locking of two holding fixtures according to the invention on the work-table of a milling apparatus; and FIG. 6 illustrates two holding fixtures according to the invention placed back to back one on top of the other in a vacuum chamber and ready for the welding operation by means of electron beams.

DETAILED DESCRIPTION OF EXAMPLE EMBODIMENTS

Figures 1, 2, 3, 4:
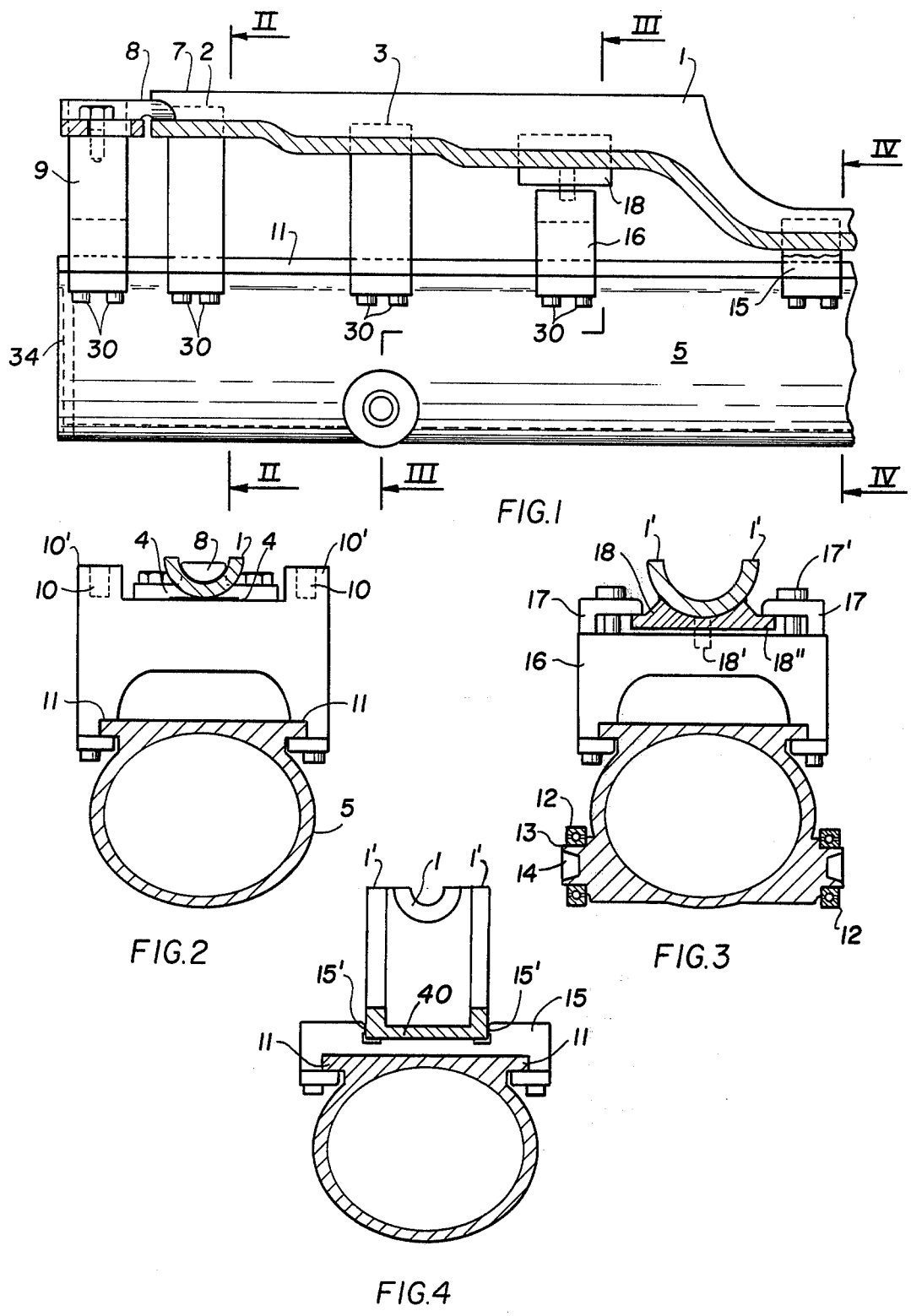
FIG. 1 illustrates a side view of a holding fixture according to the invention, whereby the right hand half of the entire fixture has been omitted as it is substantially identical to the half which is shown, and wherein the half shell member is shown in section.
FIG. 2 is a sectional view substantially along the section line II—II in FIG. 1 and showing a clamping claw.
FIG. 3 is a sectional view along the section line III—III in FIG. 1 and illustrating the use of a spring pivot seat for the half shell member.
FIG. 4 is a section substantially along the section line IV—IV in FIG. 1.

The present holding fixture according to the invention comprises a base 5 which is preferably a hollow beam as best seen in FIGS. 2, 3 or 4 and having a shape to make this beam stiff against bending and torsion. The illustrated, somewhat eliptical cross-sectional shape of the base or beam 5 has been found to be especially suitable for this purpose. The base 5 is provided with mounting ledges 11 extending along one side of the base 5. Holding means are provided which are adjustable in their position along the length of the ledges 11, for example by loosening the screws 30. When the holding means are in the proper position the screws are tightened again, whereby the holding means provide a rigid clamping bed for the half shell member 1. The holding means comprise a plurality of individual members 2 and 3 which include prismatic or vee type seat elements 4 for the shell member 1. The holding means further include clamping members 9, 15 and 16 which are also secured to the base 5 as described above.

The clamping member 9 carries at its top an adjustable claw 8 which firmly presses the end of the shell member 1 against the seat provided by the member 2. The holding member 16 has secured to its upper side a spring seat 18 which is adjustably held in position by means of clamping claws 17 which may be tightened by means of screws 17'. A boss 18' spaces the spring seat 18 slightly above the top surface of the member 16 as best seen in FIG. 3. The half shell 1 is secured to the spring seat 18, for example, by welding also as shown in FIG. 3.

The middle portion 40 of the half shell 1 is firmly seated on a holding member 15, as best seen in FIGS. 1 and 4. Since the clamping means 17 clamp down the spring seat 18 to the left and right of the middle portion 14, the shell member 1 is pressed with its middle portion 40 against the seat provided by the member 15. The right hand side of the structure is not shown. However, the shell is firmly seated because it is welded to the seat 18.

Referring to FIGS. 2 and 6 it will be noted that the holding member 9 adjacent to the end 7 of the shell 1 is provided with upwardly extending lugs 10' which in turn are provided with bores 10. These bores receive a respective centering pin 20. For example, four such centering pins are provided one at each corner of a fixture, whereby two such fixtures are locked against axial displacement relative to each other when these fixtures are placed back to back one on top of the other as illustrated in FIG. 6.

As mentioned, the spring seat 18 is shaped to receive the shell member 1 on its seating surface and the shell member 1 may be welded to the seat 18 which is also provided with laterally extending shoulders contacted by said claws 17 which press the seat 18 downwardly while still leaving the gap 18" between the upper surface of the member 16 and the lower surface of the seat 18 as shown in FIG. 3.

In order to facilitate the transport, especially the moving of the holding fixture into a vacuum chamber there are provided four rollers 12 secured to respective axle studs 13 preferably forming an integral part of the base 5. The axle studs 13 are provided with outwardly facing recesses 14 by means of which the respective base 5 may be arrested in a fixed position, for example on the clamping table 31 of a milling apparatus 32 as shown in FIG. 5. The holding fixtures are thus lockable in a plane extending in parallel to the plane defined by the rollers 12.

Incidentally, the holding member 15 for securely seating the middle portion of the shell member 1 is also provided with prism or vee type seat elements 15' as best seen in FIG. 4. These elements 15' provide a recess in the holding member 15 which securely receives the lower contour of the shell member 1.

The shell member 1 is provided with welding surfaces 1' which require machining in order to provide the required close tolerance contact with the corresponding welding surfaces of another shell member. These welding surfaces 1' may be machined on a milling machine as partially shown in FIG. 5. The milling machine has secured to its worktable 31 movable clamping bolts 19 and further clamping studs 19' which fit into the respective recesses 14 of the axle studs 13. Although FIG. 5 shows the arrangement of two holding fixtures in parallel to each other on the same milling table 31 which has the advantage that both half shell members may be milled simultaneously, it will be appreciated that the half shell members may also be milled separately in order to provide the necessary welding surfaces. In any event, a precise milling is possible because the shell members are securely held in axial alignment by the holding fixtures according to the invention, whereby any warping of the shell members is prevented.

When the milling has been completed two holding fixtures with the respective half shells attached thereto are placed into the vacuum welding chamber 25 as shown in FIG. 6. The welding chamber 25 has a shape 26 sufficient to accommodate two holding fixtures in a back to back relationship as shown. Preferably the welding chamber is provided with rails 33 on which the rollers 12 of the lower holding fixture may be rolled into the chamber and if desired past stationary electron beams 27. It is also possible to lock the piggy-back arrangement into a stationary position and to move the electron beams.

Due to the centering pins 20 received in the centering recesses 10, the two holding fixtures are secured relative to each other so that a longitudinal relative shifting is prevented. The weight of the upper fixture is sufficient to securely hold the two half shells in contact with each other along the welding surfaces, without the need for any additional means for pressing down or holding the fixtures. Incidentally, if the electron beams 27 are movable, the fixtures could be locked in position with means similar to the locking bolts 19 shown in FIG. 5.

Incidentally, the space inside the base 5 could be filled with a foaming material, for example polyurethane, as has been indicated in the left hand portion of FIG. 5. The base 5 could also be closed at both ends, preferably in a vacuum tight manner. One closure 34 is indicated by dashed lines at the left hand end of FIG. 1.

Although the invention has been described with reference to specific example embodiments, it is to be understood, that it is intended to cover all modifications and equivalents within the scope of the appended claims.

What is claimed is:

1. A clamping apparatus for holding longitudinal half shell sections of workpieces so that a work surface of the workpiece may be presented in sequence to different operations without removal of the workpiece from the clamping apparatus for producing tubular bodies from said half shell sections, comprising a base in the form of a hollow carrier beam which is stiff against bending and torsion, mounting means (11) forming part of said hollow carrier beam along one side thereof, holding means (9, 16, 15, 15') secured to said mounting means and spaced along said hollow carrier beam with predetermined spacings between adjacent holding means, said holding means including clamping means for clamping a shell section against said hollow carrier beam at several points along the length of the shell section, said holding means further including claw means for securing the ends of a shell section to said hollow carrier beam whereby edges of said shell section are exposed first for a machining operation and then for a welding operation and warping of the workpiece is avoided.

2. The apparatus according to claim 1, wherein said mounting means (11) and said holding means (9, 16, 15, 15') comprise cooperating vee-type clamping means whereby said holding means are adjustable in their position along said mounting means of said hollow carrier beam.

3. The apparatus according to claim 1, wherein said holding means comprise a spring seat means (18) secured to said shell section and clamped to said mounting means by said clamping means.

4. The apparatus according to claim 3, wherein said spring seat means are welded to said shell section.

5. The apparatus according to claim 1, further comprising roller means secured to said hollow carrier beam, and positioning means secured to said hollow carrier beam for locking said hollow carrier beam in a fixed position relative to any other operating means.

6. The apparatus according to claim 5, wherein said positioning means are formed as integral studs extending laterally away from said hollow carrier beam, said roller means being secured to said studs, said studs comprising means for accomplishing said locking.

7. The apparatus according to claim 1, wherein said hollow carrier beam is filled with a synthetic foaming material.

8. The apparatus according to claim 1, wherein said hollow carrier beam is closed at both ends in a pressure tight manner.

9. The apparatus according to claim 1, further comprising means for locating a second like apparatus back to back relative to said first mentioned apparatus whereby any shifting between the first and second apparatus is prevented.

10. The apparatus according to claim 9, wherein said locating means comprise recesses in said holding means adjacent to the ends of said shell section, said recesses being adapted to receive respective locating pins for preventing said shifting.

* * * * *